United States Patent [19]

Lawson et al.

[11] 4,393,938

[45] Jul. 19, 1983

[54] TREATING WELLS WITH ION-EXCHANGE-PRECIPITATED SCALE INHIBITOR

[75] Inventors: Jimmie B. Lawson; Edwin A. Richardson, both of Houston, Tex.

[73] Assignee: Shell Oil Company, Houston, Tex.

[21] Appl. No.: 252,566

[22] Filed: Apr. 9, 1981

[51] Int. Cl.³ .................... E21B 43/16; E21B 43/25; C09K 3/00
[52] U.S. Cl. ............................. 166/279; 166/305 R; 252/8.55 B
[58] Field of Search .................. 252/8.55 B; 166/275, 166/279, 305 R

[56] References Cited

U.S. PATENT DOCUMENTS

| | | | |
|---|---|---|---|
| 3,481,400 | 12/1969 | Kerver | 166/279 |
| 3,483,925 | 12/1969 | Slykar | 166/279 |
| 3,633,672 | 1/1972 | Smith | 252/8.55 B X |
| 4,074,755 | 2/1978 | Hill | 166/252 |
| 4,357,248 | 11/1982 | Berkshire et al. | 252/8.55 B |

Primary Examiner—Benjamin R. Padgett
Assistant Examiner—Catherine S. Kilby

[57] ABSTRACT

The scaling of a production well in a clay-containing reservoir is inhibited by injecting a scale inhibitor dissolved in an aqueous solution having a pH and ratio of monovalent-to-multivalent cations such that multivalent cation salts of the inhibitor are precipitated as a result of a cation-exchange within the reservoir.

5 Claims, 1 Drawing Figure

TREATING WELLS WITH ION-EXCHANGE-PRECIPITATED SCALE INHIBITOR

BACKGROUND OF THE INVENTION

Relatively low concentrations of water-soluble, organic scale inhibitors are known to reduce the rate of scale formation in and around the bottom of a producing well. Scales are slightly soluble inorganic salts, such as calcium or barium sulfates or calcium carbonate, etc. The mechanism of the inhibition is probably a combination of sequestering or complexing of multivalent cations and an absorption of inhibitor onto solid surfaces such as the rapid growth planes of newly formed crystalites. Although a wide variety of materials inhibit crystal growth, the compounds most commonly used in well treatments are organic phosphates or phosphonates or adducts of acrylic acid or the like. Where supersaturated, or scale-forming, waters are encountered in an oil production operation, scale inhibitors are commonly injected or "squeezed" into the reservoir formation. The squeezing amounts to injecting the inhibitior and, usually, overflushing the treated zone with water. The well is placed back on production and the entrainment of the inhibitor in the produced water protects the wellbore and downhole equipment from scale build-up.

The squeezing is a convenient way to apply an inhibitor since there is no injection equipment to install or maintain. It is known to be generally desirable that a scale inhibitor be produced in low concentrations within the produced water, such as from about 25 to 100 parts per million. But, this goal is almost never achieved. Generally, most of the injected inhibitor is quickly produced. Various attempts to delay the rate of its production, such as causing it to be adsorbed on the rock surfaces, are only partially successful. And, this has also been true of prior attempts to induce the precipitation within the reservoir of slightly soluble multivalent cation salts of the inhibitor.

For example, U.S. Pat. No. 3,483,925 mentions the problems of obtaining a gradual and uniform return of a squeezed-in inhibitor and proposes the injection of alternating slugs of inhibitor solution and a polymer-thickened solution. U.S. Pat. No. 3,633,672 proposes injecting an inhibitor which forms multivalent cation salts which are only slightly soluble in substantially neutral or alkaline water with both the inhibitor and a compound containing multivalent cations dissolved in an acidic aqueous liquid, so that the relatively insoluble salt of the inhibitor is precipitated when the acid is neutralized within the reservoir. U.S. Pat. No. 3,704,750 suggests injecting a strongly acidic solution of a monovalent cation salt of polyacrylic acid or amide and a salt of a multivalent cation, to cause a similar precipitation of an inhibitor of low solubility when the acid is neutralized within the reservoir. U.S. Pat. No. 3,782,469 proposes that an inhibitor be adsorbed on fracture-propping grains which are then emplaced within a fracture in the reservoir in order to provide a reliably coated source of surfaces form which the inhibitor is desorbed.

Our patent application Ser. No. 150,382, filed May 16, 1980 now U.S. Pat. No. 4,357,248, discloses that the scaling of a producing well can be inhibited by injecting into the reservoir a self-reacting alkaline aqueous solution of a pH-lowering reactant, a compound containing scale-inhibiting anions and a compound containing multivalent cations, which solution subsequently precipitates a slightly soluble scale inhibitor within the reservoir. The disclosures of that application are incorporated herein by cross-reference.

SUMMARY OF THE INVENTION

The present invention relates to a scale-inhibiting process for treating as well which produces at least some aqueous fluid from a clay-containing subterranean reservoir that tends to exchange cations with those contained within an injected aqueous liquid. A solution is prepared by dissolving at least one compound that contains scale-inhibiting anions in an aqueous solution which contains at least about 100 times more monovalent cations than multivalent cations and has a pH at which the multivalent cation salts of the scale-inhibiting anions are only slightly soluble. The solution is injected into the reservoir so that clay surfaces containing significant proportions of adsorbed multivalent cations are contacted by the solution. And, the rate of the injection is controlled so that the cation-exchange between the solution and those clay surfaces introduces enough cations into the solution to precipitate an effective amount of the multivalent cation salts of the scale-inhibiting anions within a near-well portion of the reservoir.

DESCRIPTION OF THE INVENTION

Figure 1:
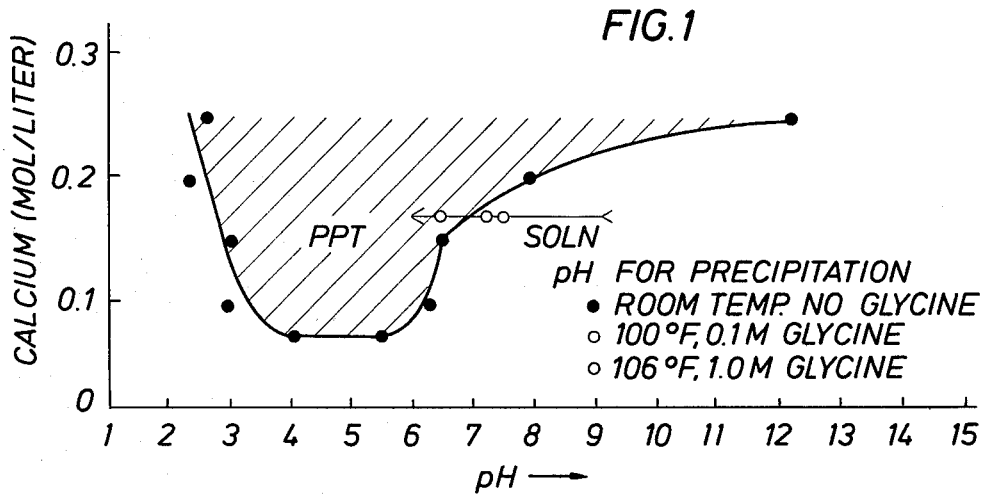
FIG. 1 shows a plot of regions, calcium ion concentrations, and solution pH's, which cause a precipitation of the calcium salts of a scale inhibitor.

This invention is, at least in part, premised on a discovery that the ion-exchange capacity of a clay-containing reservoir can be utilized to provide a scale-inhibitor-precipitating mechanism capable of causing the precipitated inhibitor to be removed by fluid produced from the reservoir more slowly than would be the case if the inhibitor were simply squeezed into the reservoir in the conventional manner. Where a reservoir has a significant ion-exchange capacity, it is relatively simple to ensure that the clay surfaces within the reservoir rocks contain a significant proportion of adsorbed multivalent cations.

Reservoirs which contain more than about 3%, and particularly those which contain more than about 5% of clay, tend to exhibit significant ion-exchange capabilities suitable for use in the present process. The clays encountered in such reservoirs are known to have lattice structures in which positive and negative ions do not achieve electroneutrality. The lattice of such a clay retains a net negative charge and the charge becomes balanced (or neutralized) by an adsorption of cations when the clay is immersed in an aqueous environment. In such a situation the adsorbed ions can migrate from the solid to the liquid and back, as long as the electroneutrality is maintained. Multivalent cations tend to be more strongly attracted to the clays than are monovalent cations. However, where an aqueous solution contains a strong predominance of monovalent cations, the dissolved monovalent ions tend to be exchanged for the adsorbed multivalent ions so that many multivalent cations become dissolved in the solution.

When the presently described type of inhibitor-containing-solution is injected into a reservoir having a significant ion-exchange capacity, it interacts with the rocks which it contacts. Since it is strongly predominant in monovalent cations, it loses them to the rocks in exchange for multivalent cations. But, since the multivalent cation salts of the inhibitor are only very slightly soluble, this exchange causes the precipitation of the scale inhibitor. When an aqueous fluid is produced from the reservoir, some, but only small proportions, of the so-precipitated salts are dissolved in the produced fluid.

In the present process the scale inhibitor to be used should be one which (a) is capable of preventing scaling by the fluid produced from the reservoir at the reservoir temperature when it is present in the aqueous phase of that fluid in a relatively low concentration of not significantly more than about 100 parts per million and (b) forms multivalent cation salts having water-solubilities which are significant, but low, in an aqueous liquid which is relatively near neutral; e.g., having a pH of from about 6 to 8.

In the present process the pH at which the inhibitor-containing solution is flowed into the well should be correlated relative to the injectivity and temperature properties of the well and the reservoir. Such factors should be correlated at least to the extent required to avoid any significant amount of premature precipitation along the face of the reservoir formation. The initial alkalinity of the inhibitor-containing solution can be provided by one or a combination of alkaline or acidic compounds or materials. Substantially any water-soluble materials which are compatible with the other components and the scale inhibitor-precipitation reaction can be used. The alkali metal hydroxides and/or the alkaline alkali metal salts of the scale inhibitor being used are particularly suitable as alkaline materials. Water-soluble non-oxidizing acids are generally suitable as acidic materials.

Preferred scale inhibitors for use in the present process comprise those which have the above compatibility and are members of the group consisting of phosphate and phosphonate scale inhibitors. And, particularly suitable inhibitors for use in the present invention comprise nitrogen-containing phosphonate scale-inhibiting compounds such as the nitrilotri(methylene phosphonic acid) or diethylenetriaminepenta(methylene phosphonic acid) which are available from Monsanto Chemical Compnay under the trade names Dequest 2000 and Dequest 2060. Other suitable inhibitors include Dequest 2010, 2041 and 2051 inhibitors. Tests of calcium salts of Dequest 2060 as precipitated from the present self-precipitating scale inhibition solutions have shown that they prevent precipitation of $CaSO_4$ and $CaCO_3$ minerals from waters which are supersaturated with the latter.

Where desirable, a buffering system can be used to maintain the near neutrality of the inhibitor-containing solution. In general, a buffering system suitable for use in the present process is one which is compatible with the inhibitor solution components and is capable of maintaining a pH of from about 5 to 10 at which the inhibitor remains soluble until the solution has been transported from the surface to the reservoir. The cations of the ionized components of such a buffer system are preferably monovalent cations, which tend to increase the ratio of monovalent to multivalent cations. For example, with respect to the particularly suitable Dequest 2060 inhibitor, a substantially ideal buffer would have a pka of about 7.5 to 8.5, which would require only a relatively low concentration of buffer. However, sodium bicarbonate (pka about 6.4) and glycine (pka about 9.5) have been found to be generally suitable in view of their compatibility, operability and relatively low cost and high availability.

In the present process, as in other well treating operations involving an injection of an aqueous liquid, it is generally preferable to use the brine produced from the reservoir or an aqueous solution substantially equivalent to that brine in kinds and amounts of monovalent ions. The salt contents of various typical oilfield brines from wells in which scaling problems occur and which wells could advantageously be treated by an inhibitor squeeze operation are listed in Table I. Where a brine produced from or near a well to be treated contains significant proportions of multivalent cations it can be softened, for example by means of currently available systems and procedures, to provide the high ratio of monovalent to multivalent cations required for the present process.

Table II lists the solubilities of the calcium salt of Dequest 2060 inhibitor in the brines listed in Table I. For inhibitor salts to inhibit scaling, they must be soluble enough to maintain at least a low level of the inhibitor in the solution produced from the reservoir. As indicated in Table II, such solubilities were exhibited by the salts of that Dequest inhibitor in each of the tested brines.

TABLE I

| Analyses of Brines Produced from Wells in Texas | | | | | | | | |
|---|---|---|---|---|---|---|---|---|
| Well No. 1 | | | Well No. 2 | | | Well No. 3 | | |
| Ion | mg/Liter | mol/Liter | Ion | mg/Liter | mol/Liter | Ion | mg/Liter | mol/Liter |
| Cl | 49.500 | 1.394 | Cl | 86.000 | 2.423 | Cl | 105.500 | 2.972 |
| Ca | 3.360 | 0.084 | Ca | 6.120 | 0.153 | Ca | 13.040 | 0.326 |
| Mg | .753 | 0.031 | Mg | 1.288 | 0.053 | Mg | 1.774 | 0.073 |
| $HCO_3$ | 610 | 0.010 | $HCO_3$ | 610 | 0.010 | $HCO_3$ | 366 | 0.006 |
| $SO_4$ | 3.350 | 0.035 | $SO_4$ | 5.150 | 0.054 | $SO_4$ | 1.800 | 0.019 |
| Na | 28.589 | 1.243 | Na | 48.989 | 2.126 | Na | 50.968 | 2.126 |

TABLE II

| Solubilities of Calcium Dequest Salts in Representative Field Brines @ 100° F. | | | | |
|---|---|---|---|---|
| Brine | Cation | Inhibitor | pH | Solubility, PPM |
| Well 1 | Calcium | Dequest 2060 | 5.97 | 540 |
| " | " | " | 6.55 | 529 |
| " | " | " | 7.05 | 518 |
| " | " | " | 7.50 | 518 |
| Well 2 | " | " | 5.97 | 488 |
| " | " | " | 6.50 | 540 |
| " | " | " | 6.98 | 492 |
| " | " | " | 7.55 | 400 |
| Well 3 | " | " | 5.97 | 437 |
| " | " | " | 6.50 | 448 |
| " | " | " | 7.03 | 422 |
| " | " | " | 7.55 | 400 |

It should be noted that in Table I the concentrations of both calcium and magnesium ions increased in the tested brines, in the order of Well Nos. 1, 2, 3. Because of this, the common ion effect would be expected to decrease the solubility of the salts in the same order and this is indicated in the data in Table II.

But, note that a different result is indicated by the data in Table III. Since the downhole pH of a brine is usually an unknown quantity (since only cooled and de-gassed samples are usually subjected to pH measurements) a series of samples of the same brines were adjusted to pH's 6.0, 6.5, 7.0 and 7.5. In separate tests, calcium and magnesium salts of each of the inhibitors Dequest 2000 and 2060 were added to such samples and stirred intermittently at 100° F. for 7 to 13 days after which the precipitates were filtered-out on 0.45 micron acetate filters and the filtrates were analyzed for phosphorous, in order to determine the concentrations of the inhibitor. These tests indicated a reversal of the solubility orders between the calcium and magnesium salts. Although the common ion effect (due to the increasing concentrations of calcium and magnesium in the brines 1, 2, 3) decreased the solubility of the salts in the same order regarding Dequest 2060, this was not true regarding Dequest 2000. Such complications may be due to the fact that any anionic inhibitor which goes into solution from a salt will be complexing with its non-common ion (e.g. some of the inhibitor from a calcium salt will complex with the magnesium in solution). This makes for a very complicated interaction in which simple predictions are not necessarily realized in fact. In addition, since the indicated pH's were measured at room temperature, the values were probably shifted at 100° F. Further, the solution of the weak acid inhibitor anions would also shift the pH's as they neared equilibrium.

pack representative of) the reservoir formation. Such a core or pack should be maintained at the reservoir temperature and should initially contain the reservoir fluids, such as oil or water (or fluids equivalent to them), in the saturations existing in the reservoir. If a pretreatment fluid may be injected ahead of the inhibitor-containing solution in the field operation, it should be injected into the core. The volume of injected inhibitor solution is preferably in the order of one-half pore volume of the core, so that a frontal portion is left in contact with the reservoir fluids and/or pretreatment fluid. The reservoir brine (or its equivalent) is then flowed through the core, preferably from the direction opposite to that used in injecting the inhibitor solution at a rate and temperature representative of the field production operation. Such flow tests can be indicative of whether and to what extent the cation-adsorption sites of the reservoir rock are predominantly occupied by multivalent cations. If that predominance is undesirably low it can be increased by injecting a slug of an aqueous solution having a high preponderance of multivalent cations. If the ion-exchange capacity of the rock is relatively low, the volume of rock contacted by the inhibitor-containing solution can be made relatively large. For example, the inhibitor-containing solution (preferably with at least some decrease in the concentration of the inhibitor) can have a volume large enough to fill a relatively large zone, and/or can be displaced relatively far from the well by displacing it with an inert solution. Such procedures will distribute smaller proportions of the precipitated inhibitor salt throughout a larger region of the reservoir, rather than depositing a higher concentration within a smaller region around the well.

The solubility relationship for a particular cation-inhibitor combination depends on the mole ratio of

TABLE III

Solubilities of Calcium and Magnesium Dequest Salts in Representative Field Brines @ 100° F.

| Brine | Cation | Inhibitor | Set pH | (PPM) | Brine | Cation | Inhibitor | Set pH | (PPM) |
|---|---|---|---|---|---|---|---|---|---|
| 1 | Calcium | Dequest 2060 | 5.97 | 540 | 1 | Calcium | Dequest 2000 | 6.05 | 302 |
|  |  |  | 6.55 | 529 |  |  |  | 6.50 | 437 |
|  |  |  | 7.05 | 518 |  |  |  | 7.03 | 437 |
|  |  |  | 7.50 | 518 |  |  |  | 7.50 | 391 |
| 2 | Calcium | " | 5.97 | 488 | 2 | Calcium | " | 5.90 | 374 |
|  |  |  | 6.50 | 540 |  |  |  | 6.50 | 410 |
|  |  |  | 6.98 | 492 |  |  |  | 7.00 | 368 |
|  |  |  | 7.55 | 400 |  |  |  | 7.54 | 368 |
| 3 | Calcium | " | 5.97 | 437 | 3 | Calcium | " | 6.02 | 387 |
|  |  |  | 6.50 | 448 |  |  |  | 7.00 | 407 |
|  |  |  | 7.03 | 422 |  |  |  | 7.00 | 407 |
|  |  |  | 7.55 | 400 |  |  |  | 7.48 | 420 |
| 1 | Magnesium | Dequest 2060 | 6.00 | 370 | 1 | Magnesium | Dequest 2060 | 6.03 | 460 |
|  |  |  | 6.50 | 374 |  |  |  | 6.50 | 3.74 |
|  |  |  | 7.02 | 370 |  |  |  | 6.95 | 427 |
|  |  |  | 7.48 | 366 |  |  |  | 7.48 | 335 |
| 2 | Magnesium | " | 6.03 | 407 | 2 | Magnesium | " | 6.00 | 387 |
|  |  |  | 6.50 | 381 |  |  |  | 6.52 | 345 |
|  |  |  | 7.00 | 392 |  |  |  | 7.02 | 345 |
|  |  |  | 7.50 | 377 |  |  |  | 7.50 | 322 |
| 3 | Magnesium | " | 6.00 | 366 | 3 | Magnesium | " | 6.02 | 361 |
|  |  |  | 6.50 | 374 |  |  |  | 6.50 | 348 |
|  |  |  | 7.03 | 366 |  |  |  | 7.00 | 328 |
|  |  |  | 7.52 | 370 |  |  |  | 7.52 | 348 |

In a particularly preferred procedure, determinations are made of the correlations between the inhibitor solution composition and the injectivity, temperature, and electrolyte properties of the well and reservoir. Such determinations preferably include flow tests. Such tests may involve injecting a monovalent cation-predominant inhibitor salt solution into a core from (or a sand cations to the inhibitor-anions. With respect to calcium salts in a solution containing 0.05 moles per liter of the Dequest 2060 inhibitor such a relationship is shown in FIG. 1 of the drawing. If a solution is made up with a composition outside the shaded region and is then moved into it, for example, by changing the pH and/or increasing the concentration of multivalent cations, precipitation will occur. The arrow depicts the pH course of an actual test, at 100° F., using methyl formate to provide a pH changing reaction which lowered the pH from 9.0 to 5.8 in 16 hours.

In certain situations, it may be desirable to employ a combination of the present process and at least some aspects of the process of application Ser. No. 150,382. This may be desirable where, for example, the ion-exchange capability of the reservoir may not induce sufficient inhibitor precipitation relative to the amount of aqueous fluid which will be produced through the well. Such a low capacity may be due to an insufficient clay content or a relatively high rate of aqueous liquid production. A combination of the present and prior processes can be provided by including within the present monovalent-cation-predominant saline solution of scale inhibitor (a) substantially all of the multivalent cations that can be tolerated without causing the scale inhibitor to be precipitated at the reservoir temperature and (b) sufficient acid-reacting reagent to cause a significant lowering of the pH after the solution has entered the reservoir. As will be apparent from FIG. 1, such a combination can be provided by including an acid-yielding reactant within substantially any solution of the present type which has a pH exceeding one at which precipitation will be caused by the presence of less calcium. In general, such a combination may increase the amount of inhibitor salt precipitation due to both the addition of multivalent cations resulting from an ion-exchange and the lowering of the solution pH into a region in which the multivalent cation salt of the inhibitor is less soluble.

In the present type of inhibitor-precipitating solution, it is generally advantageous to at least substantially saturate the solution with multivalent cations. This causes the monovalent-cation-predominant solution to contain substantially all of the multivalent cations which can be tolerated at the pH and temperature the solution will have in the reservoir. Such a saturation tends to enhance the efficiency with which multivalent cations are desorbed from the reservoir rocks. It causes each multivalent ion which is exchanged from the clay to the solution to be substantially immediately precipitated as an inhibitor-containing salt, rather than remaining in a cation-exchange equilibrium between the ions in the solution and those on the clay. And, this maintains a driving force for continuing such an exchanging of the ions until substantially all of the multivalent ions are removed from the rocks.

Berea Sandstone Core Tests

Laboratory tests were conducted in Berea Sandstone cores 2"×2"×2' in dimension at temperatures of about 100°–105° F. In one test, using a core having a permeability of about 624 millidarcys and a pore volume of about 300 milliliters, the core was initially saturated with a solution of 0.5 molar calcium chloride and 0.001 molar sodium chloride. About 1 pore volume of an aqueous solution of 0.005 M calcium chloride and 0.0001 M sodium chloride was injected into the core. This was followed by a one-half pore volume slug of scale-inhibitor-containing solution in which 0.05 M Dequest 2000, phosphonate scale-inhibitor was disolved in distilled water.

After a time of about 2 hours to allow for an ion-exchange induced precipitation of the inhibitor salt, a flow through the core of synthetic reservoir brine was initiated. The composition of that brine is given in Table I, Well No. 2. The synthetic brine was flowed through the core in a direction opposite to that along which the inhibitor-containing slug was injected, in order to simulate the production of a reservoir brine from an inhibitor-treated well.

Figure 2:
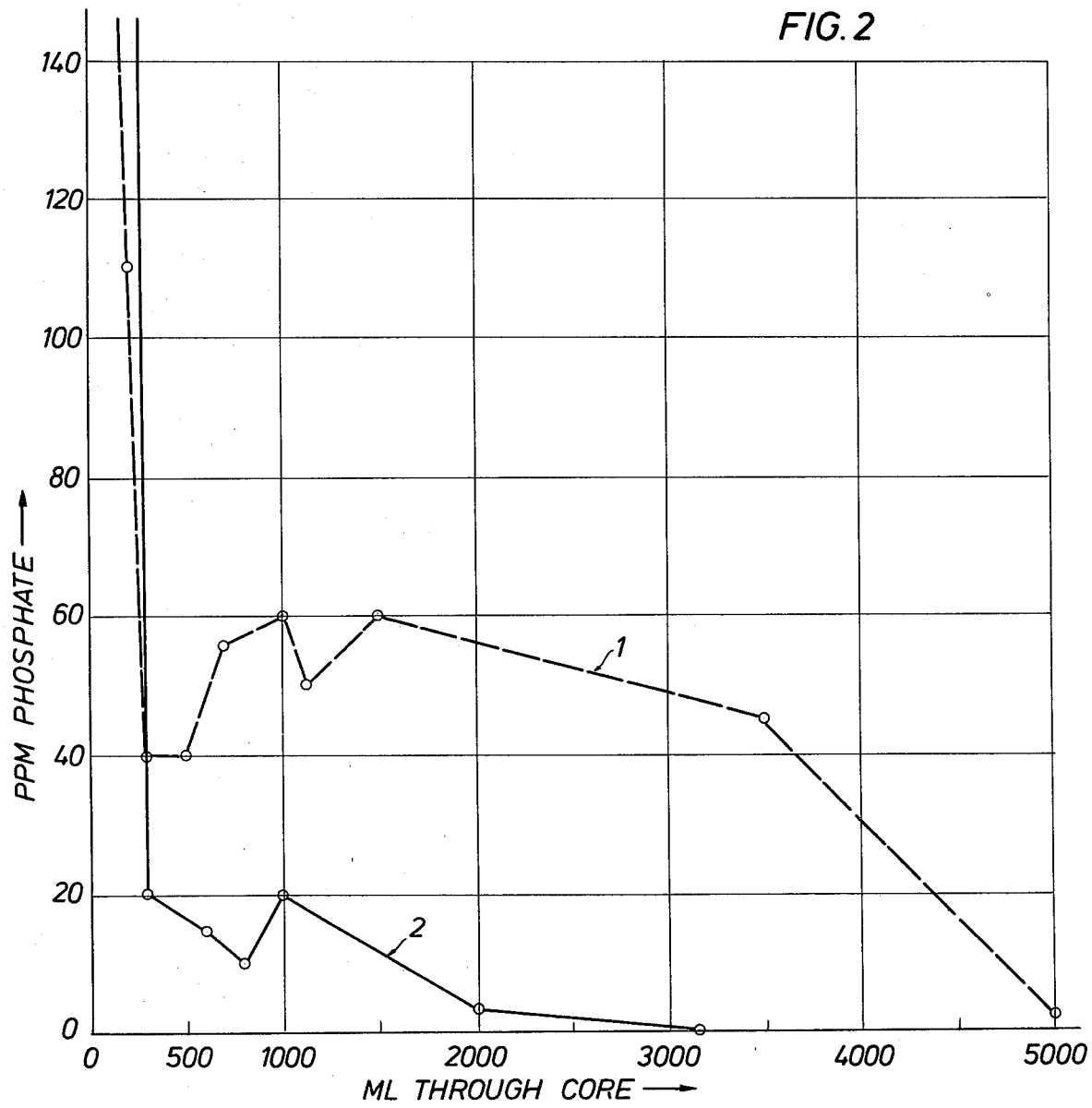
FIG. 2 shows the variations with amounts of fluid produced in the amounts of a precipitated scale inhibitor which is dissolved in a core through which a brine is flowed.

Samples of the brine which flowed through the core were analyzed for phosphate content. After an initial surge of 2150 ppm in the first 20 ml of effluent, the rate of dissolving the precipitated inhibitor settled down to about 30 to 60 ppm throughout about the first 15 pore volumes of the brine. The phosphate content of the brine then slowly declined until it was about 4 ppm by the time 5000 mls, or 20 pore volumes of the treated simulated reservoir zone, had flowed through the core. This behavior is shown by Curve 1 of FIG. 2.

A control experiment was conducted in a similar core which was saturated with a 1% solution of sodium chloride in distilled water. A 0.5 pore volume of 0.05 M. Dequest dissolved in distilled water was then injected into the core. Some pressure buildup was noted in this core, although it had an initial permeability of 659 md. Based on previous experience, and the nature of the solutions injected, the pressure buildup was probably due to the precipitation of multivalent ion salts of the inhibitor and/or movement of fine clay particles which are characteristic of such Berea Sandstone cores. After leaving the core shut in for about 2 hours the same synthetic reservoir brine was flowed through the core and analyzed as described above.

The initial surge of dissolved inhibitor salt, occurring within the first 20 mls of effluent, was 3200 ppm. This was followed by a relatively rapid decline to about 20 ppm during the flow of only 3 pore volumes. After about 7 pore volumes, the phosphate content was less than 1 ppm and the test was terminated after a flow of about 10 pore volumes. This behavior is shown by Curve 2 of FIG. 2.

It is believed to be apparent that the present ion-exchange-induced precipitation of scale inhibitor is capable of causing a very significant increase in the amount of aqueous fluid which can be produced from a treated well without removing the precipitated scale inhibitor from the reservoir.

Clay-Containing Sand Pack Tests

Sand packs were prepared from a medium grain size sand mixed with about 5% Glenrose shale. The packs used had a porosity of about 40%, a pore volume of about 250 ccs and a permeability of about 3 darcys. The packs were initially permeated with an aqueous solution containing 0.15 moles per liter calcium chloride and 0.0015 moles per liter of sodium chloride, which solution was pumped through the pack until all air was displaced. A 50-cc slug of a solution of 0.0015 moles per liter calcium chloride and 0.000015 moles per liter of sodium chloride in distilled water was then injected. This was followed by 50 ccs of 0.05 moles per liter Dequest 2000 scale inhibitor in distilled water.

After allowing the pack to stand overnight, a snythetic reservoir water was flowed through the pack in the opposite direction. The composition of the reservoir water was the same as given in Table I, Well No. 2. Table IV shows the amounts of this simulated produced aqueous fluid which was flowed through the pack, the phosphate content of the indicated increments of that fluid, and a calculated estimate of the decimal fraction of the precipitated scale inhibitor which was removed by the cumulative flow of fluid.

It is believed to be apparent that the ion-exchange precipitation of the inhibitor was clearly effective in casing a slow dissolving of the salt within the simulated produced fluid. After a production of about 18 pore volumes of the simulated treated zone, about 64% of the precipitated inhibitor salt still remained within that zone and was still being dissolved in the produced fluid in a concentration of about 63 ppm.

TABLE IV

| Fluid Produced (Ml) | Phosphate Content (ppm) | Fraction Removed (Decimal) |
|---|---|---|
| 53 | 5.75 | 0.00025 |
| 99 | 5.75 | 0.00047 |
| 156 | 4.50 | 0.00069 |
| 206 | 4.12 | 0.00080 |
| 1081 | 333 | .245 |
| 1111 | 350 | .255 |
| 1180 | 105 | .26 |
| 1241 | 95 | .27 |
| 1294 | 140 | .27 |
| 1348 | 115 | .28 |
| 1398 | 113 | .28 |
| 1463 | 80 | .285 |
| 1528 | 36 | .285 |
| 1582 | 66 | .29 |
| 2532 | 207.5 | .457 |
| 2602 | 197.5 | .468 |
| 2655 | 195 | .477 |
| 2705 | 180 | .48 |
| 2780 | 170 | .49 |
| 2840 | 157.5 | .50 |
| 2917 | 157.5 | .51 |
| 2983 | 142 | .52 |
| 3943 | 115 | .61 |
| 3997 | 77.5 | .62 |
| 4060 | 75.0 | .62 |
| 4158 | 76.2 | .63 |
| 4232 | 72.5 | .63 |
| 4287 | 71.3 | .635 |
| 4248 | 62.5 | .638 |
| 4416 | 62.5 | .638 |

What is claimed is:

1. A well treating process for inhibiting scaling by fluid which is produced from a clay-containing subterranean reservoir which tends to exchange cations with those contained within an injected aqueous solution, comprising:

dissolving within an aqueous solution of relatively neutral pH (a) at least one nitrogen-containing phosphonate scale inhibiting compound which contains scale-inhibiting anions that form multivalent cation salts which are only slightly soluble at the pH of the solution and (b) enough of at least one substantially neutral salt to both provide a ratio of monovalent-to-multivalent cations of at least about 100 and to substantially saturate the solution with respect to multivalent cation salts of the scale-inhibiting anions;

injecting said solution into a portion of said reservoir which (a) has a significant tendency to exchange cations with those contained within an injected aqueous solution and (b) contains a significant proportion of adsorbed multivalent cations; and, controlling the rate at which said solution is injected so that at least some portions of that solution remain relatively near the well long enough to induce a significant precipitation of scale inhibitor salt due to the ion-exchange-induced addition of multivalent cations to the solution.

2. The process of claim 1 in which the reservoir is pretreated, to the extent required in order to ensure the presence of a significant proportion of multivalent cations on the ion-exchange sites of the reservoir rock, by injecting a saline aqueous liquid containing a significant preponderance of multivalent cations.

3. The process of claim 1 or 2 in which the reservoir rock has a clay content of at least about 3% by weight.

4. The process of claim 1 or 2 in which the ion-exchange capacity of the reservoir rock is relatively low and the scale inhibitor solution is injected or displaced in a manner causing it to contact and undergo an ion-exchange with the reservoir rocks within a relatively large zone around the well.

5. The process of claim 1 or 2 in which the scale-inhibiting anions are members of the group consisting of phosphate and phosphonate scale-inhibiting anions.

* * * * *